UNITED STATES PATENT OFFICE 2,392,590

BONDING BUTYL RUBBER TO OTHER SURFACES

William H. Hulswit, Jr., and Henry C. Wiechman, Detroit, Mich., assignors to United States Rubber Company, New York, N. Y., a corporation of New Jersey No Drawing. Application April 2, 1943, Serial No. 481,592

2 Claims. (Cl. 154—14)

This invention relates to improvements in bonding Butyl rubber to other surfaces, including ordinary rubber and metals, and more particularly to an improvement in means for bonding Butyl (or Flexon) tread stocks to rubber tire casings in the recapping of rubber tires.

The major problem of recapping of rubber tires with Butyl or Flexon tread stocks is the development of a proper tie stock, that is, bonding stock that will give good adhesion, as for example, at about 250° F. The poor adhesion between Butyl rubber and ordinary rubber has reduced the field of application for which Butyl rubber could be adapted, and the recapping of worn rubber casings has emphasized this problem. It is probable that when raw Butyl rubber is cured against ordinary rubber the much higher "unsaturation" of the ordinary rubber "hogs" all or most all of the sulfur, with the result that the Butyl rubber is substantially uncured at the interface, consequently providing a weak bond, with very little strength.

It has now been found that if a composition composed predominantly of precured Butyl or Flexon rubber is used as a tie stock or bond between the uncured Butyl or Flexon tread and the rubber casing, that the aforesaid difficulty can be overcome. An adhesion strength of about 20 lbs. per linear inch at room temperature and 9 lbs. per linear inch at 250° F. can be obtained.

It is understood that Butyl rubber is referred to as a rubber-like copolymer of a diolefine and isobutylene, and that Flexon is chemically similar to Butyl rubber but differs in that it can be produced with simplified equipment and is somewhat inferior to Butyl rubber. At present the diolefine that is used is isoprene (2-methyl butadiene (1,3)). The present invention, however, can be worked with either Butyl or Flexon rubber, and for such purposes the tie material is referred to herein as a vulcanizable copolymer of a diolefine and isobutylene, or an elastic tie stock composed predominantly of a cured copolymer of a diolefine and isobutylene.

The following example is given to illustrate the invention in connection with a recapping procedure, but it is to be understood as not limiting thereto, either as to proportions, temperatures, compounding ingredients, or remilling operations; the parts are by weight:

Example

The following Butyl stock is used in this example after compounding the same as follows:

| | Parts |
|---|---|
| Butyl rubber | 106.5 |
| Stearic acid | 4 |
| Wyex (carbon black) | 60 |
| Tuads | 1 |
| Captax | 0.5 |

The 106.5 parts of Butyl rubber contains about 5 parts of zinc oxide and 1.5 parts of sulfur. The compounded mixture is cured for about 120 minutes at 45 pounds per square inch steam pressure and is then milled and refined. About 5.8 parts of additional sulfur are added during the refining operation; this additional sulfur seems to help adhesion somewhat but is not necessary. The stock is then taken off the refining mill at about 0.010 inch gauge, 5½ inches wide (for a 6.00—16/4 tire). This stock is the tie stock.

The rubber tire is first buffed, as usual, for recapping. Two coats of a natural rubber tread cement are then applied; the first coat is dried before the second coat is applied.

One side of the tie stock is treated with a natural rubber tread cement and the treated side of the tie stock is then stitched by means of a stitcher roll to the cement-treated rubber casing.

The uncured Butyl rubber recapping stock may conveniently be of the same recipe as given in tabular form above. The inside surface of the prepared recap slab, together with the exposed surface of the tie stock, are softened with gasoline or painted with a Butyl tread cement and the recap slab is then stitched into place on the tie stock. The tire is then cured for about 120 minutes at 302° F., and cooled for about 30 minutes in the press.

Instead of Tuads (tetramethyl thiuram disulfide) or Captax (mercaptobenzothiazole), other organic accelerators or a combination of accelerators, may be used to aid in curing the Butyl rubber. Also, other curing agents, such as the quinone-dioximes or salts thereof, which are known as organic curing agents for both ordinary rubber and Butyl rubber, may be used instead of or together with the sulfur and/or other curing agents.

Having thus described our invention, what we claim and desire to protect by Letters Patent is:

1. A method of recapping rubber tires with a vulcanizable rubber-like copolymer of a conjugated diolefine and isobutylene tread stock which comprises superposing on the rubber tire casing, a tie stock layer of cured rubber-like copolymer of a conjugated diolefine and isobutylene and including curing, accelerating, and reinforcing ingredients, superposing on said tie stock layer, a layer of said tread stock, transiently adhering and stitching together, respectively, the casing, tie stock, and tread stock, and subjecting the assembly to pressure and heat sufficient to cure the unvulcanized portions of the assembled tire.

2. A method of recapping rubber tires with a vulcanizable rubber-like copolymer of a conjugated diolefine and isobutylene tread stock which comprises superposing on the rubber tire casing, a carbon black-containing tie stock layer of cured rubber-like copolymer of a conjugated diolefine and isobutylene and including curing and accelerating ingredients, superposing on said tie stock layer, a layer of said tread stock, transiently adhering and stitching together, respectively, the casing, tie stock, and tread stock, and subjecting the assembly to pressure and heat sufficient to cure the unvulcanized portions of the assembled tire.

WILLIAM H. HULSWIT, JR.
HENRY C. WIECHMAN.